(12) United States Patent
Mayorgo

(10) Patent No.: US 10,785,249 B2
(45) Date of Patent: Sep. 22, 2020

(54) PREDICTING THE RISK ASSOCIATED WITH A NETWORK FLOW, SUCH AS ONE INVOLVING AN IOT DEVICE, AND APPLYING AN APPROPRIATE LEVEL OF SECURITY INSPECTION BASED THEREON

(71) Applicant: Fortinet, Inc., Sunnyvale, CA (US)

(72) Inventor: Marcelo Mayorgo, Fort Lauderdale, FL (US)

(73) Assignee: Fortinet, Inc., Sunnyvale, CA (US)

( * ) Notice: Subject to any disclaimer, the term of this patent is extended or adjusted under 35 U.S.C. 154(b) by 135 days.

(21) Appl. No.: 15/480,660

(22) Filed: Apr. 6, 2017

(65) Prior Publication Data

US 2018/0295148 A1    Oct. 11, 2018

(51) Int. Cl.
*H04L 29/06*        (2006.01)
*H04W 4/70*        (2018.01)
*H04L 12/813*      (2013.01)
*H04L 29/08*        (2006.01)
*H04W 12/00*      (2009.01)

(52) U.S. Cl.
CPC ........ *H04L 63/1433* (2013.01); *H04L 63/105* (2013.01); *H04L 63/20* (2013.01); *H04W 4/70* (2018.02); *H04L 47/20* (2013.01); *H04L 67/12* (2013.01); *H04W 12/00505* (2019.01)

(58) Field of Classification Search
USPC ............ 726/1, 2, 21, 26; 713/150, 163, 181; 380/255, 264, 276
See application file for complete search history.

(56) References Cited

U.S. PATENT DOCUMENTS

| | | | | |
|---|---|---|---|---|
| 2006/0026682 A1* | 2/2006 | Zakas | ................. | H04L 63/0263 726/22 |
| 2007/0199070 A1* | 8/2007 | Hughes | ............... | H04L 63/1416 726/23 |
| 2012/0278890 A1* | 11/2012 | Maatta | ................ | H04L 63/1425 726/23 |
| 2013/0097710 A1* | 4/2013 | Basavapatna | ......... | H04W 4/029 726/25 |
| 2013/0333032 A1* | 12/2013 | Delatorre | ............ | H04L 63/1441 726/23 |
| 2014/0096251 A1* | 4/2014 | Doctor | ................ | H04L 63/1408 726/23 |
| 2015/0215334 A1* | 7/2015 | Bingham | ............ | H04L 63/1425 726/23 |

(Continued)

*Primary Examiner* — Sharif E Ullah
(74) *Attorney, Agent, or Firm* — Jaffery Watson Mendonsa & Hamilton LLP

(57) ABSTRACT

Systems and methods for applying a risk-based approach to security inspection of network flows is provided. According to one embodiment, a packet of a flow between a first and second device coupled with a private network is received by a network security device. If an explicit flow policy is defined for the flow, it is applied to the flow; otherwise: (i) a risk level associated with the flow is obtained based on one or more of attributes of the flow, one or more derived attributes of the flow, one or more attributes of the first or second device, analysis of local or remote security logs, environmental parameters, past experience with the first or second device or with a device similar, and behavior of the flow; and (ii) a flow policy selected from multiple flow policies based on the obtained risk level is applied to the flow.

26 Claims, 11 Drawing Sheets

(56) References Cited

U.S. PATENT DOCUMENTS

2015/0221193 A1\* 8/2015 Pragada ............. G06K 9/00771
 348/153
2017/0104790 A1\* 4/2017 Meyers ............... H04L 63/1433
2018/0089014 A1\* 3/2018 Smith ................. G06F 11/0751

\* cited by examiner

400

| Overall Risk | Flows | Action | Reason |
|---|---|---|---|
| 0.0 | Many | Pass/Allow | Many Connections were Considered and All Resulted in no Risk. Allow Traffic. |
| 0.1 | Few | Inspect Using Firewall | Although no Risk was Found, there were Few Matching Connections, not enough to Guess. Recommended to Inspect. |
| 0.5 | Many | Inspect Using Firewall + Antivirus | Enough Risk and Connections to Justify Inspection. Recommended to Inspect. |
| 0.5 | Few | Inspect Using Firewall + Antivirus + IPS | Although not many Connections, Risk by itself Justifies the Risk. Recommended to Inspect. |
| 0.9 | Few | Inspect Using Firewall + Antivirus + IPS + Sandboxing | High Risk but not enough Connections to Conclude. Traffic should be Blocked. Recommended for Stronger Inspection. |
| 0.9 | Many | Block | High Risk in many Connections. Should be Blocked. |

FIG. 4

PREDICTING THE RISK ASSOCIATED WITH A NETWORK FLOW, SUCH AS ONE INVOLVING AN IOT DEVICE, AND APPLYING AN APPROPRIATE LEVEL OF SECURITY INSPECTION BASED THEREON

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2017, Fortinet, Inc.

BACKGROUND

Field

Embodiments of the present invention generally relate to network security. In particular, embodiments of the present invention relate to performing a risk level assessment of a communication flow between two network devices—including, Internet-of-Things (IoT) devices—and association or recommendation of a security policy to be applied to the flow based on the assessed risk level.

Description of the Related Art

The Internet has been utilized as a platform through which people can share information and act as producers/consumers of such information. In the future, it is expected that an IoT era will arrive in which devices, including, but not limited to, vehicles, wearables, home appliances and the like are embedded with network connectivity that will enable them to collect and exchange data with or without the need of human intervention. As the concept of controlling and managing things via the Internet has spread, a variety of types of products have emerged.

Apart from IoT-based home appliances, such as televisions, fans, light bulbs, washing machines, and refrigerators, many other types of IoT devices, such as smart watches, fitness trackers, and wearable devices are also gaining popularity. Users of such devices often move from one network (e.g., an enterprise network) to another (e.g., home network) due to the portable nature of such devices. Widespread adoption of mobile wireless devices, wearable devices/technologies, IoT and the like present new security challenges to network administrators. For instance, an administrator of an enterprise network must now, apart from handling existing computing assets, such as laptops, personal computers, and servers, also handle IoT devices, each of which may have its own connection/flow characteristics, protocols, communication methods, among other attributes. Therefore, network flow control policies applied to known assets (e.g., laptops) cannot be simply applied to these newly introduced devices. Prevailing model of positive-security—everything is denied unless it is explicitly allowed—might have worked well in the past but won't necessarily scale in the IoT era where network flow information will be unknown in advance by the administrator. One approach to overcome this challenge would be to fully inspect all traffic, which although might be perceived as secure, is not scalable and therefore infeasible in view of the performance requirements that a system may need. Another option would be to simply not inspect anything in the network layer maybe handing over responsibility to other layers in the system; however, this would lead to unsecure networks. A third option could be to maintain the status-quo and have administrators continue to attempt for manually defining flow control policies. Unfortunately, this approach will not only lead to security oversights and failures, but will be unable to scale as the number of devices connected to the network may continue to increase resulting in a break-and-fix approach and bad user experience.

There is therefore a need for improved processing of network connections/flows that accommodates increasing performance needs without sacrificing security levels.

SUMMARY

Systems and methods are described for applying a risk-based approach to security inspection of network flows. According to one embodiment, a packet of a network flow between a first device coupled with a private network and a second device coupled with the private network is received by a network security device of the private network. It is determined by the network security device whether an explicit flow policy has been defined for the network flow. When the determination is negative: (i) a risk level associated with the network flow is obtained by querying a risk assessment and provisioning engine that determines the risk level based on any or a combination of one or more attributes of the network flow, one or more derived attributes of the network flow, one or more attributes of the first device or the second device, analysis of local or remote security logs, environmental parameters, past experience with the first device, the second device or with a device similar to the first device or the second device, and behavior of the network flow; and (ii) a flow policy selected from multiple flow policies based on the obtained risk level is applied to the network flow. When the determination is affirmative, the explicit flow policy is applied to the network flow.

Other features of embodiments of the present disclosure will be apparent from accompanying drawings and from detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4 illustrates a mapping of risk levels with corresponding flow policies in accordance with an embodiment of the present invention.

DETAILED DESCRIPTION

Figure 1:
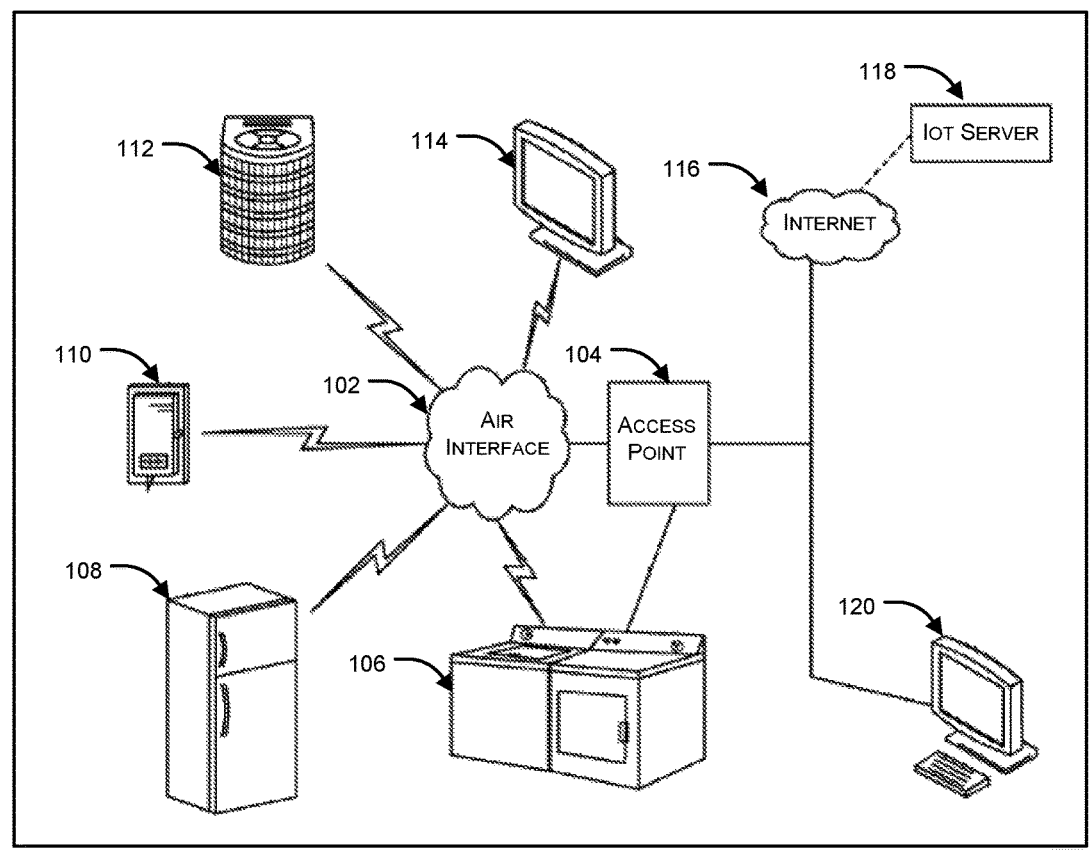
FIG. 1 illustrates exemplary network architecture in which or with which embodiments of the present invention can be implemented.

Systems and methods are described for applying a risk-based approach to security inspection of network flows/connections. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of applying a risk-based approach to security inspection of network flows, it should be appreciated that the same has been done merely to illustrate the invention in an exemplary manner and any other purpose or function for which explained structures or configurations can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Systems and methods are described for applying a risk-based approach to security inspection of network flows. According to one embodiment, risk associated with a given network flow can be predicted/determined/assessed, and security inspection level corresponding to the determined risk can be applied or recommended for the network flow. According to one embodiment, a network security system/device can be provided/configured to help predict (which may also be interchangeably referred to as assess, determine or evaluate) a level of risk associated with a network connection (which may also be interchangeably referred to as a network flow herein) and based thereon can further determine which traffic should be allowed, blocked, or inspected and to what extent.

In an aspect, the present disclosure relates to a method comprising the steps of receiving, by a network security device of a private network, a packet of a network flow between a first device coupled with the private network and a second device coupled with the private network; and determining, by the network security device, whether an explicit flow policy has been defined for the network flow. When the determination is negative, the method can include the steps of obtaining, by the network security device, a risk level associated with the network flow by querying a risk assessment and provisioning engine that determines the risk level based on any or a combination of one or more attributes of the network flow, one or more derived attributes of the network flow, one or more attributes of the first device or the second device, analysis of local or remote security logs, environmental parameters, past experience with the first device, the second device or with a device similar to the first device or the second device, and behavior of the network flow; and applying, by the network security device, a flow policy of multiple flow policies to the network flow, wherein the flow policy is selected based on the obtained risk level. On the other hand, when the determination is affirmative, the method can include the step of applying, by the network security device, the explicit flow policy to the network flow.

In an aspect, the risk level associated with a given network flow may change over time based on additional local or global observations that are provided as feedback to the risk assessment and provisioning engine.

In another aspect, the flow policy can be selected from any or a combination of allowing the network flow, denying the network flow, thoroughly inspecting the network flow, lightly inspecting the network flow, and allowing the network flow subject to one or more constraints.

In another aspect, the first device or the second device can be an Internet of Things (IoT) device, wherein the IoT device can include any or a combination of a sensor, an actuator, a smartphone, a smart TV, a thermostat, a wearable computing device, a smart lock, a camera, and an Internet Protocol (IP) enabled electronic device having network connectivity. In another aspect, association of the flow policy with the IoT device based on the obtained risk level is learned by a risk engine configured in the network security device or by the risk assessment and provisioning engine, and used for future association of one or more flow policies with an IoT device of multiple IoT devices.

In another aspect, the risk engine configured in the network security device can be configured to feed the risk assessment and provisioning engine with information pertaining to the network connection/flow and/or the result of the inspection of the network flow in order to enable the risk assessment and provisioning engine to learn the information in order to improve accuracy of risk assessment for new network flows.

In an aspect, at least one new flow policy can be added to the plurality of flow policies. Furthermore, characteristics of at least one of the plurality of flow policies can be amended by a network administrator.

In an aspect, the network security device of the present disclosure can be selected from any or a combination of a Unified Threat Management (UTM) device, a firewall, a network controller, a gateway device, an anti-virus engine, a Windows Communication Foundation (WCF) based device, a sandbox, an Intrusion Prevention System (IPS), an Intrusion Detection System (IDS), and a Deep Packet Inspection (DPI) System.

The present disclosure further relates to a network security device comprising: a non-transitory storage device having embodied therein one or more routines operable to associate a flow policy with a network flow between a first device coupled with a private network and a second device coupled with the private network; and one or more processors coupled to the non-transitory storage device and operable to execute the one or more routines. In an aspect, the one or more routines can include: a connection-based risk level assessment module, which when executed by the one or more processors, obtains a risk level associated with the network flow by querying a risk assessment and provisioning engine that determines the risk level based on any or a combination of one or more attributes of the network flow, one or more derived attributes of the network flow, one or more attributes of the first device or the second device, analysis of local or remote security logs, environmental parameters, past experience with the first device, the second device or with a device similar to the first device or the second device, and behavior of the network flow; and a determined risk level based connection traffic processing module, which when executed by the one or more processors, applies a flow policy selected from a plurality of flow policies to the network flow, wherein the flow policy is selected based on the obtained risk level. In an aspect, the connection-based risk level assessment module can be executed when an explicit flow policy for the network flow is not determinable.

FIG. 1 illustrates exemplary network architecture 100 in which or with which embodiments of the present invention can be implemented. Those skilled in the art will appreciate that aspects of the present disclosure can be applied to a variety of alternative network architectures.

As in a typical network, the network architecture of the present disclosure can include multiple network devices, including one or more Internet of Things (IoT) devices. As those of skill in the art will appreciate an IoT device may include sensing and/or control functionality as well as a WiFi transceiver radio or interface, a Bluetooth transceiver radio or interface, a Zigbee™ transceiver radio or interface, an Ultra-Wideband (UWB) transceiver radio or interface, a WiFi-Direct transceiver radio or interface, a Bluetooth Low Energy (BLE) transceiver radio or interface, and/or a variety of other current or future wireless network transceiver radios or interfaces that allow the IoT device to communicate with a wide area network and with one or more other devices. In some embodiments, an IoT device may or may not include a cellular network transceiver radio or interface, and thus may not be configured to directly communicate with a cellular network. IoT devices may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). Other network devices within network 100 may include a home automation switch that may be coupled with a home appliance. In some embodiments, network devices may be used in other environments, such as a business, a school, an establishment, a park, or any place that can support a local area network to enable communication among network devices. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices using an access device that may include a human-to-machine interface with network connection capability that allows access to a network. For example, the access device may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device may include a cellular or other broadband network transceiver radio or interface, and may be configured to communicate with a cellular or other broadband network using the cellular or broadband network transceiver radio. In some embodiments, the access device may not include a cellular network transceiver radio or interface. User may interact with the network devices using an application, a web browser, a proprietary program, or any other program executed and operated by the access device. In some embodiments, the access device may communicate directly with the network devices (e.g., communication signal). For example, the access device may communicate directly with network devices using Zigbee™ signals, Bluetooth signals, WiFi signals, infrared (IR) signals, UWB signals, WiFi-Direct signals, BLE signals, sound frequency signals, or the like. In some embodiments, the access device may communicate with the network devices via a gateway and/or a cloud network.

Local area network may include a wireless network, a wired network, or a combination of a wired and wireless networks. A wireless network may include any wireless interface or combination of wireless interfaces (e.g., Zigbee™, Bluetooth, WiFi, IR, UWB, WiFi-Direct, BLE, cellular, Long-Term Evolution (LTE), WiMax™, or the like). A wired network may include any wired interface (e.g., fiber, Ethernet, powerline Ethernet, Ethernet over coaxial cable, digital signal line (DSL), or the like). The wired and/or wireless networks may be implemented using a combination of various network infrastructure components, including routers, wireless access points, bridges, gateways, or the like, to connect devices in the local area network. For example, the local area network may include a gateway and the gateway can provide communication capabilities to network devices and/or access device via radio signals in order to provide communication, location, and/or other services to the devices. The gateway may be directly connected to the external network and may provide other gateways and devices in the local area network with access to the external network. The gateway may be designated as a primary gateway.

The network access provided by gateway may be via any of a variety of commercially-available protocols. For example, gateway may provide wireless communication capabilities for the local area network 100 using a communication protocol, such as WiFi (e.g., the IEEE 802.11 family of standards, or other wireless communication technologies, or any combination thereof). Using the communications protocol(s), the gateways may provide radio frequencies through which wireless enabled devices in the local area network can communicate. A gateway may also be referred to as a base station, an access point, Node B, Evolved Node B (eNodeB), access point base station, a Femtocell, home base station, home Node B, home eNodeB, or the like.

Gateways may include a router, a modem, a range extending device, and/or any other device that provides network access to and/or communications among one or more computing devices and/or external networks. For example, gateway may include a router or access point or a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among or between different internal and/or external networks. When a data packet is received, the router gateway may read identification information (e.g., a media access control (MAC) address) contained within the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

FIG. 1 illustrates, for informational purposes, a network 100, in which a network security device, such as an access point 104 can be operated in order to apply a risk-based approach to security inspection of network flows/connections between two or more devices. For example, access point 104 can receive at least one packet associated with a network connection/flow between a first device coupled with a private network (such as air interface 102) and a second device coupled with the same or another private/public network (such as Internet 116).

In the context of the present non-limiting example, the first device or the second device can be an Internet of Things (IoT) device, which can include any or a combination of a smart washing machine 106, a smart refrigerator 108, a thermostat 110, a smart lock 112, a smart TV 114, a sensor, an actuator, a Smartphone, a wearable computing device, a camera, an IoT server 118, and an Internet Protocol (IP) enabled electronic device 120 having network connectivity and similar current or future smart electronic devices. Those skilled in the art will appreciate that although embodiments of the present disclosure are explained with reference to IoT devices, the risk-based approach to security inspection of network flows/connections is applicable to networks including a variety of other electronic devices having network connectivity and a capability to receive and/or send packets over a network.

Similarly, it will be appreciate by those skilled in the art that although in the context of the present example certain functionality is described as being implemented by access point (AP) 104, such functionality may alternatively be implemented within a variety of other network devices and/or network security devices, including but not limited to, any or a combination of a Unified Threat Management (UTM) device, a firewall, a network controller, a gateway device, an anti-virus engine, a Windows Communication Foundation (WCF) based device, a sandbox, an Intrusion Prevention System (IPS), an Intrusion Detection System (IDS), and a Deep Packet Inspection (DPI) System, can be used to implement aspects of the present disclosure.

A malware-infected IoT device or other network device operating within a protected/private network may transmit, as part of a network flow, a network packet, representing a file, a message or portion thereof, that includes an exploit, malware, a virus, a worm, or any other undesired/malicious program, which, if undetected, may cause damage to the network or other devices within the network. As noted above, given the potential for a large volume of traffic from a wide variety of types of different network-connected devices, it is desirable to efficiently determine by a network access device and/or a network security device whether a particular network flow should be allowed, blocked, or inspected (and if so what level of inspection should be applied). Aspects of the present disclosure assist with such determination by evaluating, by means of a network security device (e.g., a firewall) though which the network flow is attempting to pass, whether an explicit flow policy (e.g., one specified by an administrator of the network) is applicable to the network flow. When an explicit flow policy is not applicable to the network flow at issue, then the network security device obtains a risk level associated with the network flow by querying a risk assessment and provisioning engine that determines the risk level based on any or a combination of one or more attributes of the network flow, one or more derived attributes of the network flow, one or more attributes of the devices associated with the network flow, analysis of local or remote security logs, environmental parameters, past experience with the devices associated with the network flow, and behavior of the network flow. Based on the obtained risk level, the network security device then selects and applies a flow policy of multiple predefined and/or configurable flow policies to the network flow. In this manner, the number of explicitly defined flow policies to be checked for a network flow at issue can be reduced and instead security inspection (e.g., content scanning) of the network flow can be performed in accordance with the perceived risk that they represent to the network. Such risk-based security inspection of network flows is both scalable and less subject to security oversights than current attempts to manually define flow control policies for every conceivable possibility that may arise within the network environment.

With reference to FIG. 1, therefore, in order to process a network flow, access point 104 can apply a risk-based approach to security inspection of network flows, wherein a risk associated with a given network flow can be determined by access point 104 (or obtained from an external source), and an appropriate level and/or type of security inspection can be determined and applied to the network flow based on the risk associated with the network flow. For example, access point 104 may assess a risk level associated with a network connection/flow (based on any or a combination of attributes of the network flow, one or more derived attributes of the network flow, one or more attributes of the devices that form part of the network flow, analysis of local or remote security logs, environmental parameters, past experience with the devices that form part of the network flow, and behavior of the network flow), and determine whether the network flow and/or particular traffic associated therewith should be allowed, blocked or inspected and to what extent based on the determined risk level.

Figure 2:
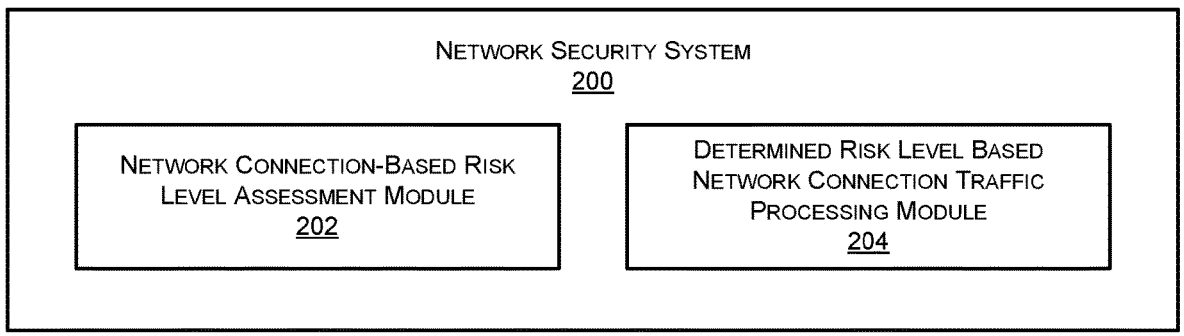
FIG. 2 illustrates an exemplary module diagram for association of a flow policy with a network flow in accordance with an embodiment of the present invention.

FIG. 2 illustrates an exemplary module diagram for association of a flow policy with a network flow in accordance with an embodiment of the present invention. In an embodiment, as shown in FIG. 2, network security system 200, implemented in say a network security device, e.g., a firewall, an intrusion prevention system (IPS) or an intrusion detection system (IDS), can include a network connection-based risk level assessment module 202 and a determined risk level based connection traffic processing module 204.

In an aspect, network security device 200 can receive a packet of a network flow involving a first device and a second device, and determine whether an explicit flow policy has been defined for the network flow and when such an explicit flow policy has been defined for the network flow, it can be used to process the network flow; otherwise, the risk-based security inspection described herein can be performed.

In an aspect, network connection-based risk level assessment module 202, which is configured as part of the network security device, obtains a risk level associated with the network flow by querying an internal or external risk assessment and provisioning engine (not shown) that determines the risk level based on any or a combination of one or more attributes of the network flow (e.g., the rate of packet flow associated with the network flow, the duration of the network connection, the frequency of connection/disconnection of network connection), one or more derived attributes of the network flow, one or more attributes of the first device or the second device (e.g., types of the devices, IP address, port details, status of the devices, domain(s) to which the devices pertain, purpose of the devices, or historical behaviors/patterns of the devices), analysis of local or remote security logs, environmental parameters (e.g., time of day, date, day of week, type of request), past experience with the first device, the second device, or with a device similar to the first device or the second device, and behavior of the network flow. Module 202 therefore evaluates attributes of the network flow along with various parameters of the devices that form part of the network flow so as to determine a perceived risk level associated with the network flow. In embodiments of the present invention, it is assumed that with higher assessed risk comes a greater potential for the network flow to include malware that may cause harm to the network or devices associated therewith.

In an aspect, determined risk level based connection traffic processing module 204, which is configured as part of the network security device, can be configured to, based on the determined risk level, apply to the network flow an appropriate risk-based flow policy selected from multiple flow policies.

In an exemplary aspect, network security device of the present disclosure also includes a security inspection engine (not shown) that applies the appropriate security scanning (e.g., antivirus processing and/or other content scanning, deep packet inspection, sandboxing, firewall, IPS and the like) as specified by the flow policy corresponding to the determined risk level of the network flow.

Those skilled in the art will appreciate that the risk level associated with a particular network flow may change over time based on, among other things, attributes associated with the network flow and/or ongoing local or global observations relating to network flows associated with devices that form part of the network flow. Therefore, for instance, as the sending device becomes more trustworthy and its risk score decreases (indicative of a lower perceived risk relating to this device), all network flows originating from the sending device become associated with lower risk scores, thereby enabling favorable flow policies to be applied to such network flows and allowing packets to be passed within the network without the significant overhead associated with performing the thorough security inspection that might be applied to a network flow perceived to be more risky.

In an exemplary implementation, flow policies can be implemented in a manner such that a first flow policy associated with the lowest risk level (i.e., a trusted network flow) allows packets to pass through network security system 200 without security inspection, a second flow policy associated with a second flow policy may require security inspection only by firewall rules, a third flow policy may require inspection using firewall rules and an antivirus engine, a fourth flow policy may require inspection using firewall rules, an antivirus engine and an IPS, a fifth flow policy may require inspection using firewall rules, an anti-virus engine, an IPS and a sandbox, and a sixth flow policy associated with highest risk level (i.e., an untrusted network flow) may block all network traffic associated with the network flow. Flow policy can therefore be selected from any or a combination of allowing the network flow/packets, denying the network flow, thoroughly inspecting the network flow, lightly inspecting the network flow, and allowing the network flow subject to one or more constraints. Those skilled in the art will appreciate more or fewer flow policies may be used depending upon the particular implementation and the desired granularity of security inspection processing to be applied.

In another aspect, the association of a particular flow policy with an IoT device or a network flow associated therewith may be based on an obtained risk level can be learned by an internal or external risk assessment and provisioning engine, wherein the association of a flow policy with the IoT device based on the obtained risk level can be used for future association of one or more flow policies with multiple IoT devices. For instance, risk engine and/or risk assessment and provisioning engine can learn parameters/attributes on the basis of which a risk level is obtained for a network flow, and can further learn the basis on which a flow policy is determined for the obtained risk level such that if similar network flow parameters/attributes are observed in connection with other network flows in the future, risk assessment and provisioning engine can assign the same/similar risk level, thereby effectively assigning the same/similar flow policy thereto. With such a self-learning system therefore, a quick, efficient, and accurate determination of the risk level associated with different types of network flows can be made along with an identification of the appropriate risk level based flow policies to be applied.

In an exemplary aspect, a risk engine that is configured in the network security device can feed the risk assessment and provisioning engine with information pertaining to one or more network connections, wherein such information can include, but is not limited to, attributes of the one or more network connections, their behavior, security policies associated with the connections, changes in risk levels associated with the connections, date and time associated with the connection, status of devices associated with the connections, among other like information. The risk engine can also share/feed the results of inspection of one or more network flows to enable the risk assessment and provisioning engine to learn the information in order to improve accuracy of risk assessment for subsequent network flows.

In an aspect, flow policies may be added or removed and the associations with particular risk levels may be modified by an administrator of network security system 200. For instance, a flow policy that earlier allowed all packets to pass through network security system 200 may be modified so as to allow only packets with size of less than N bytes to be allowed while requiring those of greater than or equal to N bytes to be inspected by an IPS. In an aspect, the addition of one or more flow policies can be triggered when new/different types of network flows/connections/packets are encountered.

Figure 3A:
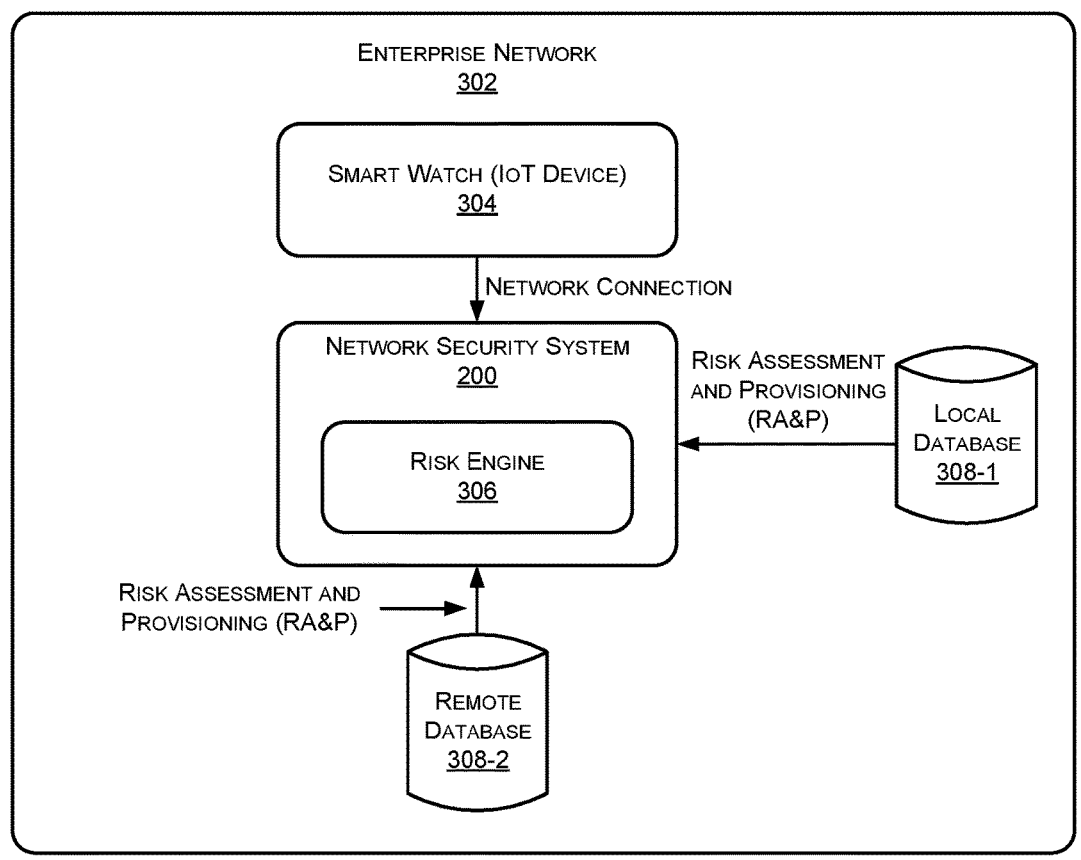
FIGS. 3A and 3B illustrate how flow policies are associated with respective network flows based on their corresponding risk levels in accordance with an embodiment of the present invention.
Figure 3B:
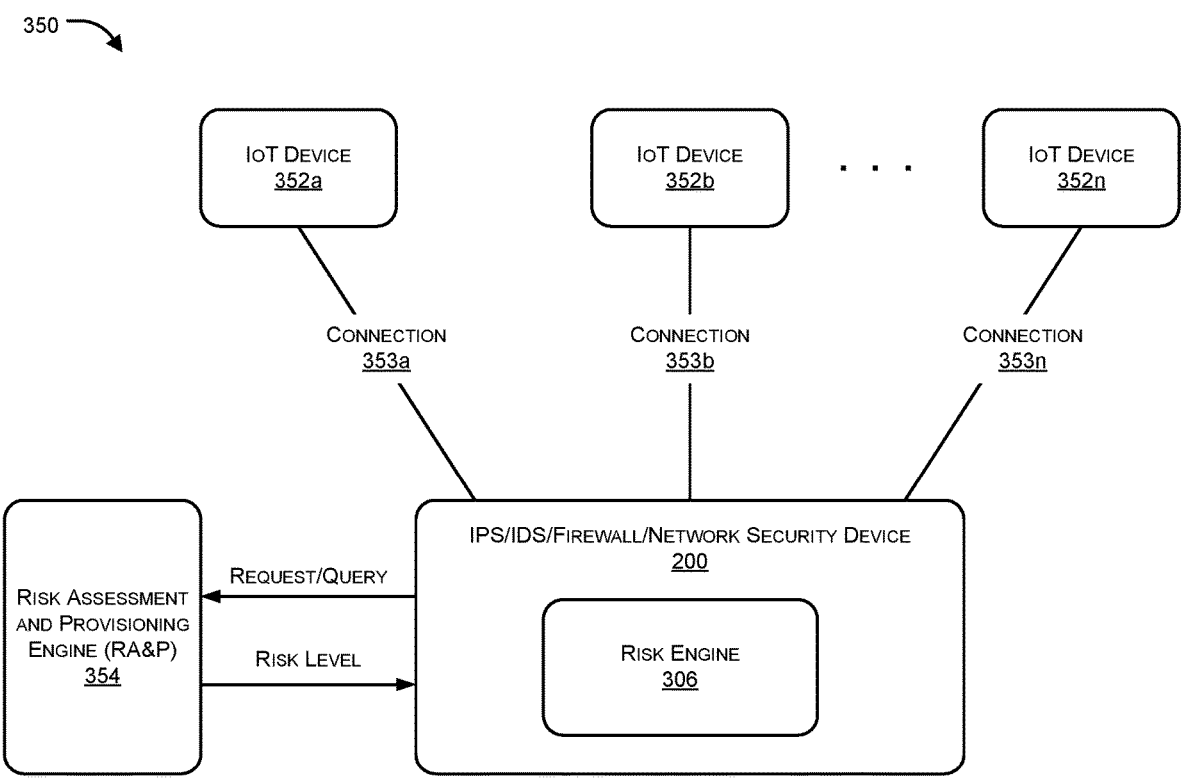

FIGS. 3A and 3B illustrate how flow policies are associated with respective network flows within a particular environment 300 based on their corresponding risk levels in accordance with an embodiment of the present invention. As shown in FIG. 3A, network security system/device 200 that can assess a risk level associated with a given network flow and apply or recommend a corresponding security inspection level accordingly may be implemented in an enterprise network 302. In an exemplary implementation, network security system 200 can be selected from, but not limited to, any or a combination of a firewall, a network controller, a gateway device, an anti-virus engine, a Windows Communication Foundation (WCF) based device, a Sandbox, an Intrusion Prevention System (IPS), an Intrusion Detection System (IDS) and a Deep Packet Inspection (DPI) system. Further, it may be understood that enterprise network 302 can be an enterprise's communications backbone that helps connect computers and related devices across departments and workgroup networks, facilitating insight and data accessibility. Enterprise network 302 can enable reduction in communication protocols and facilitate system and device interoperability, along with improving internal and/or external enterprise data management.

In an embodiment, enterprise network 302 can include one or more IoT devices such as IoT device 304 that can communicate with other smart devices and/or electronic devices available in enterprise network 302 or outside it. It may happen that the smart watch 304 becomes compromised by illegitimate users and sends communication to one or more legitimate devices in enterprise network 302 with an intention of compromising them, thereby exposing enterprise network 302 to high security risk. Enterprise network 302 may therefore benefit from a network security system that can predict a risk level of a network connection associated with IoT device 304 and determine which traffic, if any, pertaining to network flows originating from IoT device 304 should be allowed, blocked or inspected and to what extent based on the predicted risk level associate therewith. In order to mitigate security risks associated with compromised device, such as IoT device 304, enterprise network 302 can include network security system 200 that can predict the risk associated with a given network flow and apply or recommend a particular security inspection level to be applied to the network flow based on the predicted risk.

In an embodiment, in order to predict the risk level and to determine which traffic should be allowed, blocked, or inspected and to what extent based on the predicted risk level, network security system 200 can be provided with a risk engine 306 that can query, for a network flow, a local/remote database 308 and use a risk assessment and provisioning engine (RA&P engine) to determine the risk level for the network flow, and further evaluate whether, based on the determined risk level, the network flow/connection should be allowed from a particular source within or external to the enterprise network 302. Risk engine 306 residing in the network security system 200 can therefore, using the RA&P engine, obtain a risk level for a network connection and decide whether the network connection coming from smart watch 304, for example, is to be allowed, blocked or inspected and to what extent based on the determined risk level.

In an embodiment, in order to predict a risk level and associate a corresponding flow policy with a network flow based on the predicted risk level, network security system 200 can include a risk assessment and provisioning (RA&P) engine that can receive a risk level assessment request for a network flow from network security device 200/risk engine 306 and, through one or more databases 308 that stores a mapping of risk levels against determined attributes/behavior of network flows, can compute the risk level for the network flow. RA&P engine can also, in one implementation, receive logs from different IoT devices, perform data cleansing/normalization of the received logs, and correlate information in the logs to compute the risk level/score for the network flow. RA&P engine can, in another implementation, gather/store information about historical network flows and/or of devices that form part of the network flow or of similar devices, and perform data-mining and knowledge discovery from such stored information in order to obtain the risk level/score for the network flow at issue. Data gathered by the RA&P engine along with the risk score obtained for one or more network flows can be stored across one or more databases such as a local database 308-1 and a remote database 308-2. Therefore, data gathered by the RA&P engine along with the risk score obtained for a given network flow can be provided to the risk engine 306 on demand.

In an embodiment, risk engine 306 processes each new network flow, obtains a risk level for the network flow from the RA&P engine, and accordingly implements or recommends an appropriate flow policy for the network flow based on its risk level. In an exemplary implementation, risk engine 306 can also feed the RA&P engine with new logs and flow information based on processing of each network flow, thereby providing a feedback loop and enabling the RA&P engine to learn and adapt its risk assessment over time. For example, as shown in FIG. 3A, packet flows originating from smart watch 304 can be analyzed by risk engine 306 and an associated risk for the network flow can be obtained from the RA&P engine, based on which risk engine 306 can determine which traffic from the flow originating from the smart watch 304 should be allowed, blocked or inspected and to what extent.

Referring now to FIG. 3B, there is shown a network security system 200 being implemented as the network security device The network security device can be any or a combination of a firewall, a network controller, a gateway device, an anti-virus engine, a Windows Communication Foundation (WCF) based device, a Sandbox, an Intrusion Prevention System (IPS), an Intrusion Detection System (IDS) and a Deep Packet Inspection (DPI) system.

In an embodiment, as shown in FIG. 3B, network security system 200 includes a risk engine 306 communicably coupled to a risk assessment and provisioning (RA&P) engine 354. Risk engine 306, as discussed above, can receive at least one packet of a network flow between a first device coupled with a private/other network and a second device internal or external to the private/other network. RA&P engine 354, as discussed above, can be an entity that receives security logs from different devices, performs data cleansing of the received logs, processes a received network flow with respect to the logs, and correlates information so as to generate a risk score for the network flow.

Those skilled in the art will appreciate that RA&P engine 354 can be implemented in a variety of ways. In one exemplary implementation, engine 354 can store historical attributes and parameters of previously processed network flows (which it may have learned over a period of time) along with their respective risk scores. Then, when engine 354 receives a request relating to a new network flow from risk engine 306, it can extract attributes and parameters from the new network flow and associate a risk level with the new network flow based on an assessment of similarity of the stored attributes and parameters to those of the network flow at issue, including attributes of the network flow, one or more derived attributes of the network flow, one or more attributes of the devices that form part of the network flow, analysis of local or remote security logs, environmental parameters, past experience with the devices (or similar devices) that form part of the network flow, and behavior of the network flow.

In another aspect, RA&P engine 354 can gather information and, through data-mining and knowledge discovery from databases (KDD), process one or more network flows to obtain their corresponding risk scores. As mentioned above, data gathered by the RA&P engine 354 along with the risk score obtained for each network flow can be stored in a database.

In an exemplary implementation, IoT devices 352a, 352b ... 352n (hereinafter referred to as IoT devices 352) can be selected from, in a non-limiting manner, any or a combination of a sensor, an actuator, a smartphone, a smart TV, a thermostat, a wearable computing device, a smart lock, a camera, and an Internet Protocol (IP)-enabled electronic device having network connectivity, wherein such IoT devices 352 can be communicably coupled with the network security system 200 through respective connections 353a, 353b, 353n (collectively referred to as connection(s) 353). Any communication platform such as Bluetooth, Internet, Zigbee, among others can be used for establishing such connections.

FIG. 4 conceptually illustrates a mapping 400 of risk levels with corresponding flow policies in accordance with an embodiment of the present invention. In an embodiment, implementation of a flow policy for a particular network flow can be based on a risk level perceived to be associated with the network flow and, for instance, an amount of traffic considered for the prediction of the risk level. In an exemplary aspect, the number of matching network flows can also be taken into account while determining an appropriate flow policy, for example, while determining whether a given flow should be inspected, blocked or passed because it may be the case that that currently assessed risk is deemed to be very low (even 0) but analysis upon which the risk assessment is based involves very few matching network flows or is based on only a small number of observed packets. As such, less deference may be given to risk levels produced by small sample sizes with increased weight given to assessed risk levels as the volume of traffic for the associated network flows grows. As can be seen from the exemplary mapping 400 of FIG. 4, when the determined risk level/score is 0.0 (representing no perceived risk) and the risk level/score is based on an evaluation of many observed network flows, the associated flow policy can be configured to allow the traffic. Similarly, when the risk level/score is 0.1 (representing an increased perceived risk), but based upon an observation of few network flows, a minimal level of security inspection using firewall rules can be applied to the network flow at issue. Therefore, as the risk level increases and the trustworthiness of the risk level assessment increases (based on the number of network flows observed), a higher degree of security inspection can be applied to associated network flows until a risk level (e.g., 0.9 in the present example) is reached when all traffic is blocked.

Figure 5:
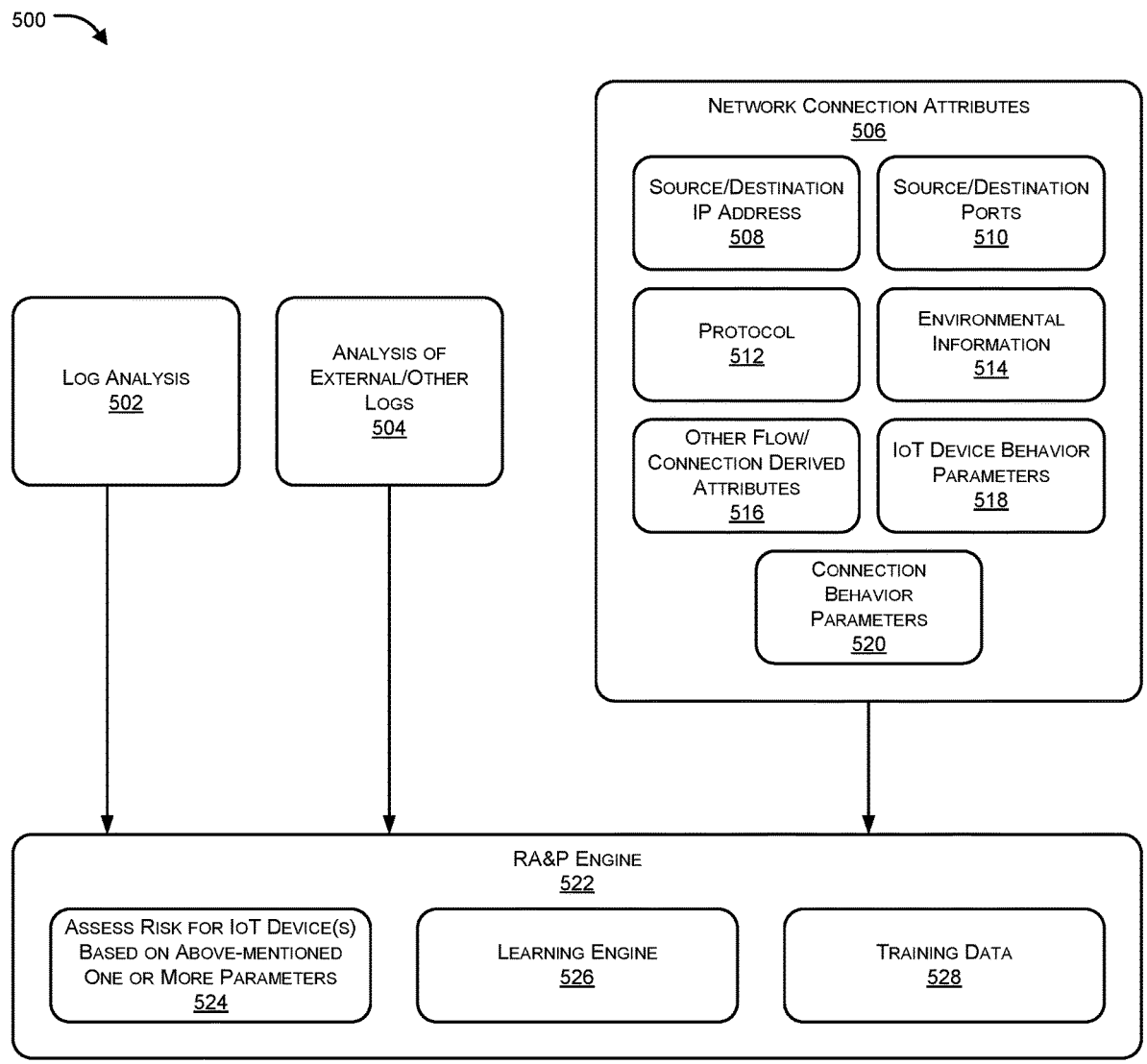
FIG. 5 is an exemplary diagram showing various parameters/attributes based on which a risk assessment and provisioning engine can determine a risk level for a network connection/flow in accordance with an embodiment of the present invention.

FIG. 5 is an exemplary diagram 500 showing various parameters/attributes based on which a risk assessment and provisioning engine (RA&P Engine) 522 can determine a risk level for a network connection/flow in accordance with an embodiment of the present invention. As described above, engine 522 can be operatively coupled with (or integrated within, depending upon the particular implementation) a network security device and configured to receive a network flow or information/attributes/parameters thereof, based on evaluation of which, engine 522 computes a risk level for the network flow.

In an aspect, engine 522 can, for the purpose of evaluating the information/attributes/parameters of an incoming network flow to be assessed, store historical information attributes/parameters relating to previously observed network flows (along with risks that were assigned thereto), network devices, IoT devices (such as type of device, access patterns, authentication techniques, working mechanism), behavior information, among other entities. Such historical information attributes/parameters can be obtained from any or a combination of log analysis 502, analysis of external/other logs 504, and network connection/flow attributes 506.

In an exemplary aspect, network connection/flow attributes 506 can include, but are not limited to, source/destination IP addresses 508, source/destination ports 510, protocol information 512, environmental information 514, other flow/connection derived attributes 516 (e.g., country of origin/destination, destination organization, user, etc.), IoT device behavior parameters 518, and connection behavior parameters 520, among any other information that can help in connection with assessing the risk associated with a network flow.

As can be seen, engine 522 can further include a learning engine 526 that can learn from how new network flows are being processed, how varying flow policies being imposed on different types of IoT devices/flows, behavior patterns of different network flows/IoT devices and parameters that are impacting imposition of flow policies on network flows/IoT devices. Such learning can be performed in real-time and can assist the engine 522 to more accurately assess the risk level for a given network flow. Engine 522 can further include training data 528 that can be used to train RA&P engine 522 before deployment. Training data 528 can be sample data or real historical data representative of attributes/parameters of different network flows/IoT.

Those skilled in the art will appreciate a network security device implementing embodiments of the present invention provides a more dynamic way of processing network traffic and scales well for the anticipated needs of future networks that will need to accommodate an increasing number and variety of types of devices. As noted in the Background, policies implemented by current network security devices, while configurable, are static (unchanging) in nature. Once an administrator defines a policy, all traffic matching that policy will go through the inspection level defined for it.

In accordance with the risk-level based approach described herein, a risk assessment is done on a per-flow basis resulting in a customized inspection for each connection. Is expected that such a system can provide a much more accurate risk level assessment than can be performed by a network administrator as many more variables can be taken into consideration, including, but not limited to a network flow's attributes (e.g., source/destination IP, source/destination ports, protocol), environmental information (e.g., time, date), flow derived attributes (e.g., country of origin/destination, destination organization, user), past experience (e.g., has a similar connection carried out an attack in the past) and even behavioral (e.g., is data being transmitted in the same way).

Embodiments of the present invention also allow more scalability as the accuracy of its risk assessment improves by learning from its own experience. For example, eventually all low risk traffic will pass through the network security device with a minimal level of security inspection, thereby freeing resources of the network security device to be devoted to higher risk flows.

Figure 6:
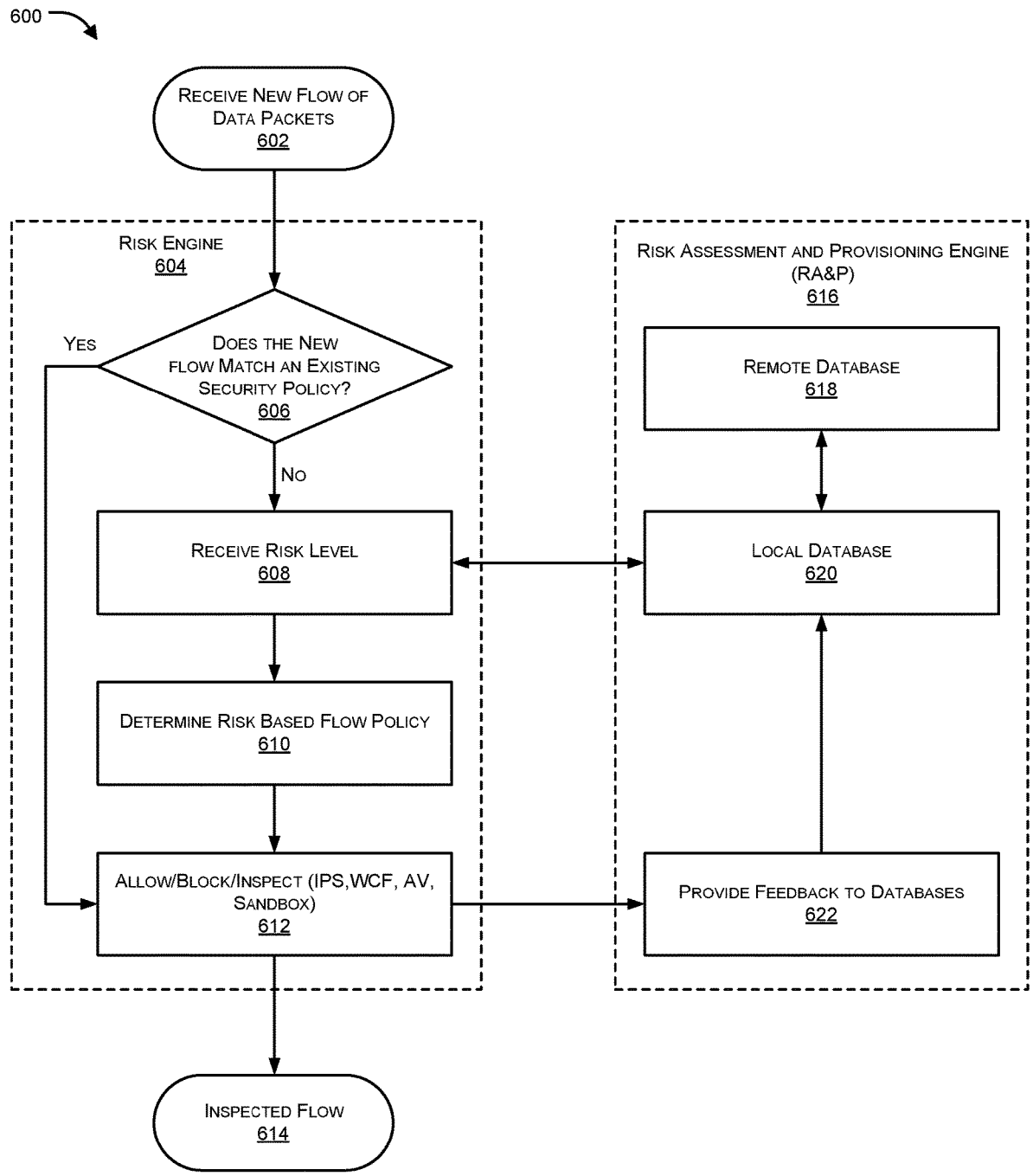
FIG. 6 is a flow diagram illustrating risk assessment for a network connection, and association of a flow policy with the network connection based on the assessed risk in accordance with an embodiment of the present invention.

FIG. 6 is a flow diagram 600 illustrating risk assessment for a network connection, and association of an appropriate flow policy with the network connection based on the assessed risk in accordance with an embodiment of the present invention. As shown at step 602, a network security device receives a packet associated with a network flow, and using risk engine 604, at step 606, determines whether an explicitly defined security policy exists for the network flow, wherein if a match exists, the explicitly defined security policy is used to process the network flow. When no matching explicitly defined security policy exists, at step 608, a risk level of the network flow is obtained using remote 618 and/or local databases 620 of RA&P engine 616, and at step 610, a flow policy for the network flow is determined based on the obtained risk level. The determined flow policy can then be used to decide whether to allow, discard, block, or inspect the packet at issue. While processing the network flow packets, feedback can also be provided by the rule engine 604 at step 622 to the engine 616 on the basis of results of the security inspection applied thereto so as to update the local/remote databases. Inspected network flow packets can be given as output at step 614.

Figure 7:
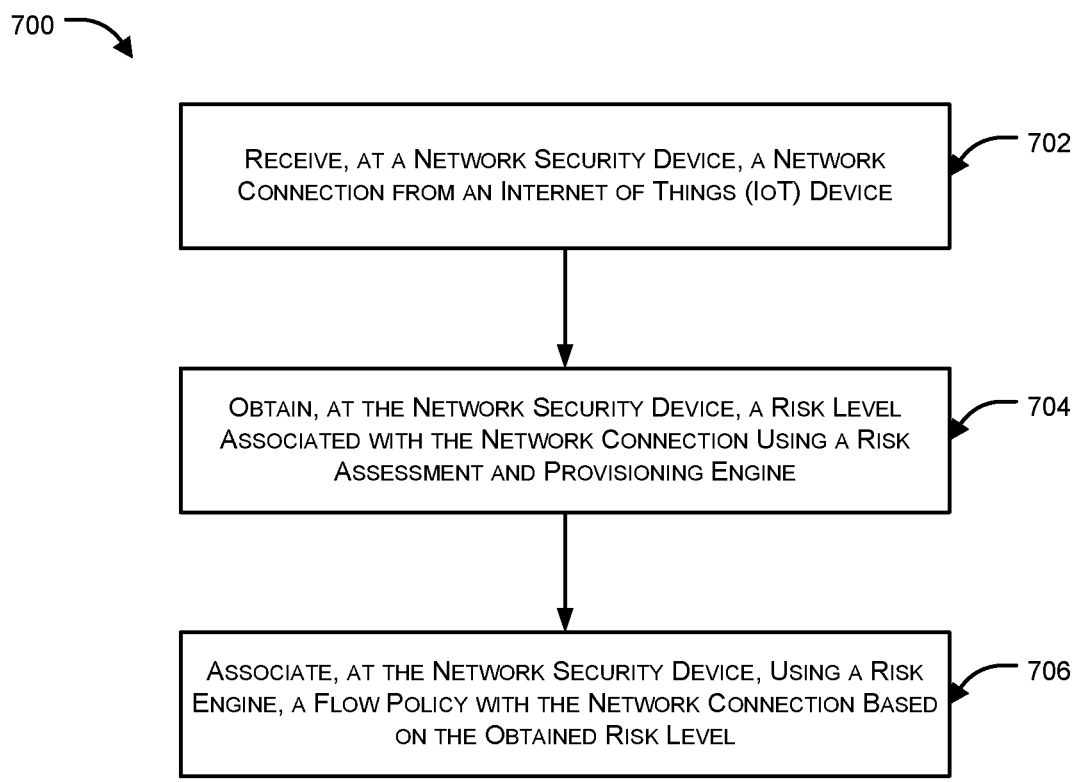
FIG. 7 is a flow diagram illustrating risk assessment for a network connection, and association of a flow policy with the network connection based on the assessed risk in accordance with another embodiment of the present invention.

FIG. 7 is a flow diagram 700 showing risk assessment for a network connection, and association of a flow policy with the network connection based on the assessed risk in accordance with another embodiment of the present invention. In an embodiment, at step 702, at least one packet of a network flow between a first device coupled with the private/other network and a second device coupled with the private/other network is received by a network security device of a private/other network. At step 704, if an explicit flow policy for the network flow is not defined/determined, the network security device obtains a risk level associated with the network flow/connection by querying a risk assessment and provisioning engine that determines the risk level.

In an embodiment, at step 706, the network security device applies a flow policy selected from multiple flow policies to the network flow/connection, wherein the flow policy can be selected based on the obtained risk level.

Figure 8:
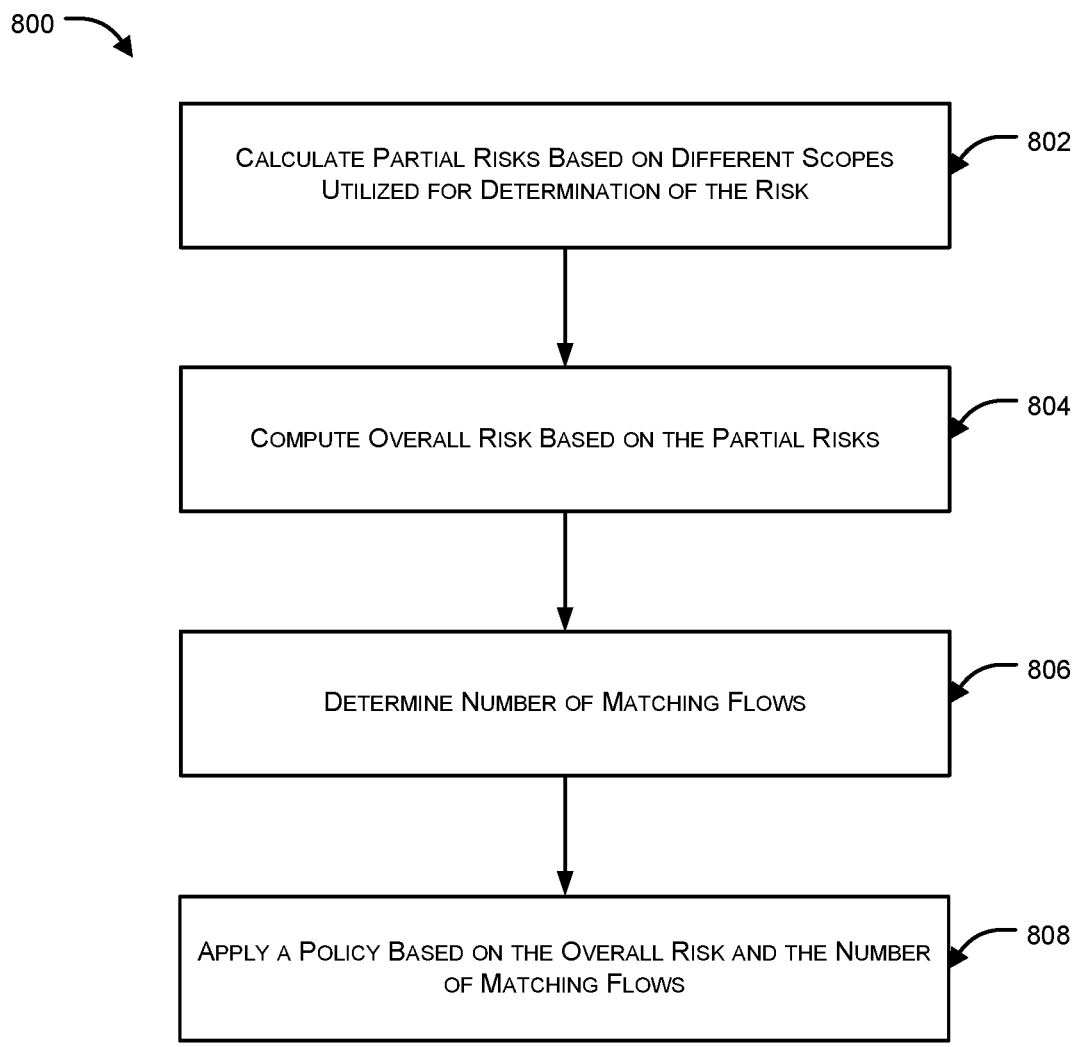
FIG. 8 is a flow diagram illustrating the data-mining process used to determine flow's risk based on historic data in accordance with another embodiment of the present invention

FIG. 8 is another flow diagram 800 showing risk assessment for a network connection in accordance with another embodiment of the present invention. FIG. 8 illustrates that while computing a risk level for a network flow, partial risk levels (also referred to as sub-levels) with respect to different individual attributes of the network flow can be initially computed, and then combined/added/aggregated at the end to compute the final risk level. For instance, a first risk score can be computed based on historic behavior of IoT devices that form part of the network flow at issue, a second risk score can be computed based on source/destination IP addresses and port information, a third risk score can be computed based on environmental conditions, a fourth risk score can be computed based on an application with which the network flow pertains, a fifth risk score can be computed based on a protocol being used, and so on. Each such scope/attribute, for example, IP addresses, past behavior, network flow attributes, protocol, ports, application, packet size, time of access/communication, among many others can also be weighted such that partial risk scores for each attribute is accordingly weighted (by multiplying weight of each attribute with the risk score for that attribute), and then summed to compute a final risk level/score for the network flow, for instance. As shown in FIG. 8, at step 802, partial risks with respect to each category of attributes/parameters can be computed by matching of historical network flows with the network flow at issue, based on which, at step 804, partial risks can be aggregated to compute the final risk. At step 806, a number of matching flows can also be determined. According to one embodiment, this allows a weight to be applied to the risk evaluation to be based on the number of historical network flows matching the network flow at issue and/or based on the number of historical network flows observed. At step 808, based on the final/overall risk and the number of matching flows, a flow policy can be assigned to the network flow at issue In an exemplary aspect, partial risks can be computed as:

$$(\text{Matching flows identified as threats}*\text{Weight})/\text{Matching Flows}$$

Overall risk on the other hand, can be calculated as a percentage of all partial risks and sum of all weights, e.g., (Sum of all Partial risks*100)/(Sum of all weights)

Figure 9:
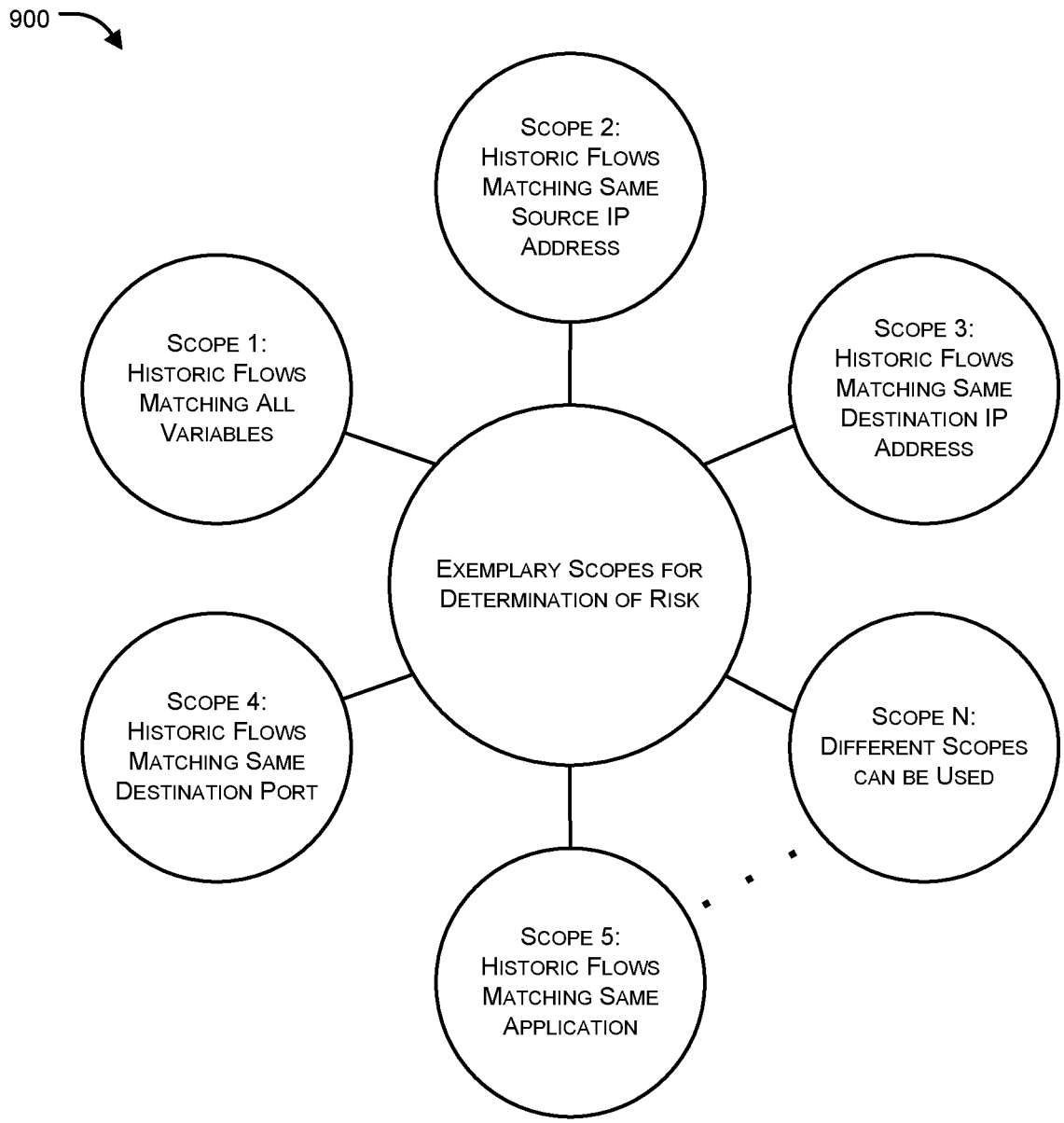
FIG. 9 is an exemplary diagram showing different scopes for determination of risk in accordance with another embodiment of the present invention

FIG. 9 is a diagram 900 illustrating how historical network flows can be matched with a network flow at issue in accordance with an embodiment of the present invention. Such matching can, for instance, result in matching of historical network flows with a network flow at issue with respect to various scopes (e.g., various categories or types of attributes). For example, a first scope may require all variables of the network flow at issue to fully match the corresponding variables of historical network flows, a second scope may require only source IP address matching, a third scope may require only destination IP address matching, a fourth scope may only require destination port matching and a fifth score may require only application matching, etc. Those skilled in the art will appreciate various other scope of matching may be implemented based on the desired level and type of matching.

In an aspect, as mentioned above, each category of attributes can be weighted differently according to its importance when trying to determine the risk of a network flow. For instance, if a particular network flow was observed to be involved in a prior attack, there is a high likelihood that a network flow matching in all respects (e.g., scope 1) is also malicious. As such, a higher weigh may be applied to the risk assessment produced by such matching. Aspects of the present disclosure may also determine whether a particular source IP address was involved in a network flow involved in a prior attack (e.g., scope 2) even if the rest of the network flow attributes might differ (e.g., a different destination IP address). Due to the lesser degree of matching, the weight associated with a risk score produced by such a match may be lower that that of scope 1, thereby contributing to a lesser extent to the overall risk calculation. Similarly, lesser weighting may be applied to the more permissive matching of scope 3, scope 4 and scope 4. Additionally, as noted above, the number of matching flows may also be taken into account to determine whether a given flow should be inspected, blocked, or let pass by weighting the match higher or lower as appropriate.

Figure 10:
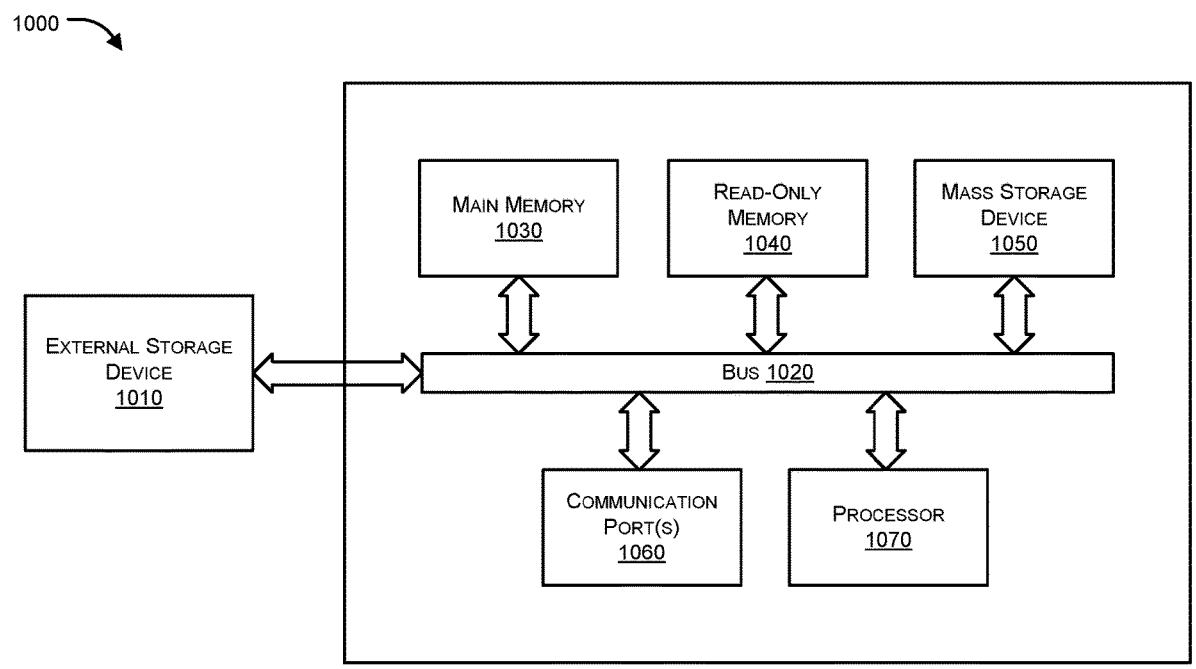
FIG. 10 illustrates an exemplary computer system in which or with which embodiments of the present invention may be utilized in accordance with embodiments of the present disclosure.

FIG. 10 illustrates an exemplary computer system 1000 in which or with which embodiments of the present invention may be utilized in accordance with embodiments of the present disclosure. Computer system 1000 includes a bus 1020 or other communication mechanism for communicating information, and a processor 1070 coupled with bus 1020 for processing information. Computer system 1000 also includes a main memory 1030, such as a random access memory (RAM) or other dynamic storage device, coupled to bus 1020 for storing information and instructions to be executed by processor 1070. Main memory 1030 also may be used for storing temporary variables or other intermediate information during execution of instructions to be executed by processor 1070. Computer system 1000 may further include a read only memory (ROM) 1040 or other static storage device coupled to bus 1020 for storing static information and instructions for processor 1070. A data/external storage device 1010, such as a magnetic disk or optical disk, is provided and coupled to bus 1020 for storing information and instructions.

Computer system 1000 may be coupled via bus 1020 to a display (not shown), such as a cathode ray tube (CRT), for displaying information to a user. An input device (not shown), including alphanumeric and other keys, can be coupled to bus 1020 for communicating information and command selections to processor 1070. Another type of user input device can be cursor control, such as a mouse, a trackball, or cursor direction keys for communicating direction information and command selections to processor 1070 and for controlling cursor movement on display. This input device typically has two degrees of freedom in two axes, a first axis (e.g., x) and a second axis (e.g., y), that allows the device to specify positions in a plane.

The invention is related to the use of computer system 1000 for a risk-based approach to security inspection of network flows. According to some embodiments of the invention, such use may be provided by computer system 1000 in response to processor 1070 executing one or more sequences of one or more instructions contained in the main memory 1030. Such instructions may be read into main memory 1030 from another computer-readable medium, such as storage device 1050. Execution of the sequences of instructions contained in main memory 1030 causes processor 1070 to perform the process steps described herein. One or more processors in a multi-processing arrangement may also be employed to execute the sequences of instructions contained in main memory 1030. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1070 for execution. Such a medium may take many forms, including but not limited to, non-volatile media, volatile media, and transmission media. Non-volatile media includes, for example, optical or magnetic disks, such as storage device 1050. Volatile media includes dynamic memory, such as main memory 1030. Transmission media includes coaxial cables, copper wire and fiber optics, including the wires that comprise bus 1020. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 1070 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1020 can receive the data carried in the infrared signal and place the data on bus 1020. Bus 1020 carries the data to main memory 1030, from which processor 1070 retrieves and executes the instructions. The instructions received by main memory 1030 may optionally be stored on storage device 1050 either before or after execution by processor 1070.

Computer system 1000 also includes a communication interface 1060 coupled to bus 1020. Communication interface 1060 can provide a two-way data communication coupling to a network link (not shown) that can be connected to a local network (not shown). For example, communication interface 1060 may be an integrated services digital network (ISDN) card or a modem to provide a data communication connection to a corresponding type of telephone line. As another example, communication interface 1060 may be a local area network (LAN) card to provide a data communication connection to a compatible LAN. Wireless links may also be implemented. In any such implementation, communication interface 1060 sends and receives electrical, electromagnetic or optical signals that carry data streams representing various types of information.

Although the methods and the network security system have been described with reference to a risk-based approach to security inspection of network flows, it should be understood that the same or similar methods and systems may also be used to determine the risk associated with a given network flow.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
receiving, by a network security device of a network, a packet of a network flow between a first device coupled with the network and a second device coupled with the network; and
responsive to receipt of the packet and in connection with evaluating whether the packet is allowed to pass through the network security device:
determining, by the network security device, whether an explicit flow policy has been defined for the network flow;
when said determining is negative, then
obtaining, by the network security device, a risk level associated with the network flow by querying a risk assessment and provisioning engine that determines the risk level based on a plurality of one or more attributes of the network flow, one or more derived attributes of the network flow, one or more attributes of the first device or the second device, analysis of local or remote security logs, environmental parameters, past experience with the first device, the second device or with a device similar to the first device or the second device, and behavior of the network flow;
performing, by the network security device, security inspection of the network flow in accordance with a risk-based approach by applying a flow policy of a plurality of flow policies, each having different degrees of security inspection thoroughness, to the network flow, wherein the flow policy is selected based on the obtained risk level and wherein an action associated with the selected flow policy causes the network security device to perform one or more types of security inspection on the network flow; and
facilitating improvement of accuracy of risk assessment performed by the risk assessment and provisioning engine by providing information regarding results of performing the one or more types of security inspection on the network flow; and
when said determining is affirmative, then applying, by the network security device, the explicit flow policy to the network flow.

2. The method of claim 1, wherein the risk level associated with the network flow changes over time based on additional local or global observations of network flows associated with one or both of the first device and the second device.

3. The method of claim 1, wherein the first device or the second device comprises an Internet of Things (IoT) device.

4. The method of claim 3, wherein the IoT device comprises any or a combination of a sensor, an actuator, a smartphone, a smart TV, a thermostat, a wearable computing device, a smart lock, a camera, and an Internet Protocol (IP) enabled electronic device having network connectivity.

5. The method of claim 1, wherein association of the flow policy with the IoT device based on the obtained risk level is learned by a risk engine configured in the network security device or by the risk assessment and provisioning engine, and used for future association of one or more flow policies with a plurality of IoT devices.

6. The method of claim 1, wherein a risk engine configured in the network security device feeds the risk assessment and provisioning engine with information pertaining to the network connection and the result of the inspection of the network flow to enable the risk assessment and provisioning engine to learn the information in order to improve accuracy of risk assessment for new network flows.

7. The method of claim 1, wherein at least one new flow policy is added to the plurality of flow policies.

8. The method of claim 1, wherein characteristics of at least one of the plurality of flow policies are amended by a network administrator.

9. The method of claim 1, wherein the network security device is any or a combination of a Unified Threat Management (UTM) device, a firewall, a network controller, a gateway device, an anti-virus engine, a Windows Communication Foundation (WCF) based device, a sandbox, an Intrusion Prevention System (IPS), an Intrusion Detection System (IDS), and a Deep Packet Inspection (DPI) System.

10. A network security device comprising:
a non-transitory storage device having embodied therein one or more routines operable to associate a flow policy with a network flow between a first device coupled with a network and a second device coupled with the network; and
one or more processors coupled to the non-transitory storage device and operable to execute the one or more routines to perform a method comprising:
receiving a packet of a network flow between a first device within the network with which the network security device is associated and a second device external to the network; and
responsive to receipt of the packet and in connection with evaluating whether the packet is allowed to pass through the network security device:
determining whether an explicit flow policy has been defined for the network flow;
when said determining is negative, then
obtaining a risk level associated with the network flow by querying a risk assessment and provisioning engine that determines the risk level based on a plurality of one or more attributes of the network flow, one or more derived attributes of the network flow, one or more attributes of the first device or the second device, analysis of local or remote security logs, environmental parameters, past experience with the first device, the second device or with a device similar to the first device or the second device, and behavior of the network flow;
performing security inspection of the network flow in accordance with a risk-based approach by applying a flow policy of a plurality of flow policies, each having different degrees of security inspection thoroughness, to the network flow, wherein the flow policy is selected based on the obtained risk level and wherein an action associated with the selected flow policy causes the network security device to perform one or more types of security inspection on the network flow; and
facilitating improvement of accuracy of risk assessment performed by the risk assessment and provisioning engine by providing information regarding results of performing the one or more types of security inspection on the network flow; and when said determining is affirmative, then applying the explicit flow policy to the network flow.

11. The network security device of claim 10, wherein the one or more types of security inspection include firewall rules.

12. The network security device of claim 11, wherein the one or more types of security inspection include content scanning.

13. The network security device of claim 11, wherein the one or more types of security inspection include antivirus scanning.

14. The network security device of claim 11, wherein the one or more types of security inspection include deep packet inspection.

15. The network security device of claim 11, wherein the one or more types of security inspection include intrusion prevention system inspection or sandboxing.

16. The network security device of claim 10, wherein the one or more attributes of the network flow include a rate of packet flow associated with the network flow, a duration of a network connection associated with the network flow, or a frequency of connection or disconnection of the network connection.

17. The network security device of claim 16, wherein the one or more attributes of the first device or the second device include a type of the first device, a status of the first device, a purpose of the first device, or historical behaviors/patterns of the first devices.

18. The network security device of claim 16, wherein the one or more attributes of the first device or the second device include a type of the second device, a status of the second device, a purpose of the second device, or historical behaviors/patterns of the second devices.

19. The method of claim 1, wherein the one or more types of security inspection include firewall rules.

20. The method of claim 19, wherein the one or more types of security inspection include content scanning.

21. The method of claim 19, wherein the one or more types of security inspection include antivirus scanning.

22. The method of claim 19, wherein the one or more types of security inspection include deep packet inspection.

23. The method of claim 19, wherein the one or more types of security inspection include intrusion prevention system inspection or sandboxing.

24. The method of claim 1, wherein the one or more attributes of the network flow include a rate of packet flow associated with the network flow, a duration of a network connection associated with the network flow, or a frequency of connection or disconnection of the network connection.

25. The method of claim 24, wherein the one or more attributes of the first device or the second device include a type of the first device, a status of the first device, a purpose of the first device, or historical behaviors/patterns of the first devices.

26. The method of claim 24, wherein the one or more attributes of the first device or the second device include a type of the second device, a status of the second device, a purpose of the second device, or historical behaviors/patterns of the second devices.

* * * * *

UNITED STATES PATENT AND TRADEMARK OFFICE
CERTIFICATE OF CORRECTION

PATENT NO. : 10,785,249 B2
APPLICATION NO. : 15/480660
DATED : September 22, 2020
INVENTOR(S) : Marcelo Mayorga Page 1 of 1

It is certified that error appears in the above-identified patent and that said Letters Patent is hereby corrected as shown below:

Item (72) - Inventor:
Delete "Mayorgo" and insert -- Mayorga --

Signed and Sealed this
Twenty-ninth Day of December, 2020

Andrei Iancu
*Director of the United States Patent and Trademark Office*